(12) United States Patent
Sato et al.

(10) Patent No.: US 9,896,008 B2
(45) Date of Patent: Feb. 20, 2018

(54) COVER ANCHOR CLIP

(71) Applicants: NIFCO INC., Yokosuka-shi (Kanagawa) (JP); TOYOTA BOSHOKU KABUSHIKI KAISHA, Kariya-shi (Aichi) (JP)

(72) Inventors: Takehiro Sato, Yokosuka (JP); Ryuji Tsunoda, Yokosuka (JP); Ryo Yasuda, Kariya (JP)

(73) Assignees: NIFCO INC., Yokosuka-shi (Kanagawa) (JP); TOYOTA BOSHOKU KABUSHIKI KAISHA, Kariya-shi (Aichi) (JP)

( * ) Notice: Subject to any disclaimer, the term of this patent is extended or adjusted under 35 U.S.C. 154(b) by 43 days.

(21) Appl. No.: 15/081,269

(22) Filed: Mar. 25, 2016

(65) Prior Publication Data
US 2016/0280106 A1 Sep. 29, 2016

(30) Foreign Application Priority Data

Mar. 27, 2015 (JP) ................................ 2015-066229

(51) Int. Cl.
*B60N 2/58* (2006.01)
*B60N 2/60* (2006.01)

(52) U.S. Cl.
CPC ......... *B60N 2/5825* (2013.01); *B60N 2/6027* (2013.01)

(58) Field of Classification Search
CPC ............................ B60N 2/6027; B60N 2/5825
See application file for complete search history.

(56) References Cited

U.S. PATENT DOCUMENTS

| 1,373,200 | A | * | 3/1921 | Pacht | ................... | B60N 2/6027 |
| | | | | | | 297/253 |
| 2005/0006944 | A1 | * | 1/2005 | Ali | ...................... | B60N 2/5825 |
| | | | | | | 297/452.6 |
| 2010/0117434 | A1 | * | 5/2010 | Galbreath | ............ | B60N 2/5825 |
| | | | | | | 297/452.58 |

(Continued)

FOREIGN PATENT DOCUMENTS

EP 2 471 416 A1 4/2012
FR 3 010 012 3/2015
(Continued)

OTHER PUBLICATIONS

Extended European Search Report Application No. 16161260.1-1754 dated Jul. 29, 2016, 7 pages.

*Primary Examiner* — Timothy J Brindley
(74) *Attorney, Agent, or Firm* — Thomas | Horstemeyer, LLP

(57) ABSTRACT

A cover anchor clip comprising a base section that is a rectangular shaped plate body for retention in a foam body, and that is formed with a plurality of through holes into which the foam body enters, the plurality of through holes are lined up along a length direction of the base section in a plurality of rows; and a plurality of anchor portions that are formed standing out from the base section side-by-side in the length direction of the base section, and each of that is configured to anchor an anchored portion fixed to a cover for covering the foam body, wherein a notch is formed to one edge out of a pair of edges of the base section, the pair of edges extends in the length direction of the base section.

7 Claims, 16 Drawing Sheets

(56) References Cited

U.S. PATENT DOCUMENTS

| | | | |
|---|---|---|---|
| 2011/0010900 A1* | 1/2011 | Gilardi | B60N 2/5825 24/588.1 |
| 2011/0227390 A1* | 9/2011 | Lovasz | B60N 2/5825 297/452.58 |
| 2011/0309667 A1* | 12/2011 | Stiller | B60N 2/5825 297/452.58 |
| 2012/0174352 A1* | 7/2012 | Tsunoda | B60N 2/5825 24/530 |
| 2012/0240364 A1* | 9/2012 | Voigt | B60N 2/5825 24/449 |
| 2013/0247338 A1* | 9/2013 | Santin | F16B 2/22 24/545 |
| 2015/0307001 A1* | 10/2015 | Sahashi | B60N 2/5825 297/218.2 |
| 2016/0023581 A1* | 1/2016 | Kheil | B60N 2/5841 297/452.61 |
| 2016/0198811 A1* | 7/2016 | Mahe | B29C 44/1271 24/444 |
| 2016/0280105 A1* | 9/2016 | Sato | B60N 2/5825 |
| 2016/0280106 A1* | 9/2016 | Sato | B60N 2/6027 |
| 2016/0280107 A1* | 9/2016 | Sato | B29C 45/0025 |
| 2017/0008436 A1* | 1/2017 | Wyatt | B60N 2/5825 |

FOREIGN PATENT DOCUMENTS

| | | |
|---|---|---|
| JP | 2013-132328 | 7/2013 |
| WO | 2011058415 A1 | 5/2011 |

* cited by examiner

COVER ANCHOR CLIP

CROSS-REFERENCE TO RELATED APPLICATION

This application claims priority under 35 USC 119 from Japanese Patent Application No. 2015-066229 filed Mar. 27, 2015, the disclosure of which is incorporated by reference herein in its entirely.

BACKGROUND

Technical Field

Preferred embodiments relates to a cover anchor clip.

Related Art

A cover anchor clip described in JPA No. 2013-132328 is disposed inside a seat pad (foam body). The cover anchor clip is a resin clip that restrains a cover member at the pad in a state in which the cover anchor clip is engaged with a lead-in member attached to the cover member covering the seat pad.

The cover anchor clip includes a base section, first and second tabs stand up from the base section so as to maintain a specific interval to each other, a restriction protrusion provided at the first tab and projecting out toward a second tab side, and an engagement tab that is provided at the second tab, extending obliquely downward and anchoring the lead-in portion such that the lead-in portion cannot be pulled out.

The cover anchor clip may be employed in a vehicle seat with an inbuilt air bag. In such cases, when the air bag deploys, the cover of the seat is pressed by the air bag from the inside of the seat. When the air bag presses the cover from the inside, a force to pull the cover anchor clip out from the foam body acts on the cover anchor clip through the cover.

SUMMARY

In consideration of the above circumstances, an object of preferred embodiments is to suppress the cover anchor clip from being pulled out of the foam body.

A cover anchor clip of a first aspect of the disclosure includes a base section that is a rectangular shaped plate body for retention in a foam body, and that is formed with plural through holes into which the foam body enters, the plural through holes are lined up along a length direction of the base section in plural rows, and plural anchor portions that are formed standing out from the base section side-by-side in the length direction of the base section, and each of that is configured to anchor an anchored portion fixed to a cover for covering the foam body. A notch is formed to one edge out of a pair of edges of the base section, the pair of edges extends in the length direction of the base section.

In the above configuration, the base section is a rectangular shaped plate body retained in the foam body and the base section is formed with plural through holes into which the foam body enters, and the plural through holes are lined up along the length direction of the base section in plural rows.

Furthermore, the plural anchor portions are formed standing out from the base section side-by-side in the length direction of the base section. The anchor portions anchor the anchored portion fixed to the cover for covering the foam body. The notch is formed to one edge of the base section.

For example, in cases in which an air bag is provided inside the seat, when the air bag deploys, the air bag presses the cover from inside the seat. When this occurs, force to pull the cover anchor clip out from the foam body acts on the cover anchor clip through the cover and through the anchored portion fixed to the cover.

As mentioned above, the notch is formed to one edge of the base section. When force to pull the cover anchor clip out from the foam body acts on the cover anchor clip, the vicinity of the notch deforms and twists in the base section retained in the foam body.

Force from the base section acting on the foam body does not act in a uniform direction due to the twisting of the base section. The cover anchor clip can thereby be suppressed from being pulled out from the foam body compared to cases in which force from the base section acts on the foam body in a uniform direction.

A cover anchor clip of a second aspect of the disclosure is the cover anchor clip of the first aspect, wherein the notch is disposed in the length direction between one of the anchor portions and another of the anchor portions.

In the configuration described above, the notch is disposed in the length direction between one of the anchor portions and another of the anchor portions. Due to disposing the notch in this manner, when force to pull the cover anchor clip out from the foam body acts on the cover anchor clip, the vicinity of the notch deforms, enabling effective twisting between a portion of the base section to which the one anchor portion is connected and a portion of the base section to which the other anchor portion is connected.

In a cover anchor clip of a third aspect of the disclosure that includes the cover anchor clip of the first aspect, the notch is respectively formed to a pair of edges of the base section, and the notches are formed at positions asymmetrical to each other about a center line of the base section extending in the length direction of the base section as viewed in a plate thickness direction of the base section.

In the above configuration, the notches are respectively formed to the pair of edges of the base section, and the pair of notches are formed at positions asymmetrical to each other about the center line of the base section extending in the length direction as viewed in the plate thickness direction of the base section.

For example, in cases in which an air bag is provided inside the seat, when the air bag deploys, the air bag presses the cover from inside the seat. When this occurs, force to pull the cover anchor clip out from the foam body acts on the cover anchor clip through the cover and through the anchored portion.

As mentioned above, the pair of notches are disposed asymmetrical to each other about the center line extending in the length direction of the base section. When force to pull the cover anchor clip out from the foam body acts on the cover anchor clip, the vicinity of the pair of notches of the base section retained in the foam body deforms and twists.

Force from the base section acting on the foam body does not act in a uniform direction due to the twisting of the base section. The cover anchor clip can thereby be suppressed from being pulling out from the foam body compared to cases in which force from the base section acts on the foam body in a uniform direction.

A cover anchor clip of a fourth aspect of the disclosure is the cover anchor clip of the third aspect, wherein the notches are disposed in the length direction between one of the anchor portions and another of the anchor portions.

In the above configuration, the notches are disposed between one of the anchor portions and another of the anchor portions in the length direction. Due to disposing the notches in this manner, when force to pull the cover anchor clip out from the foam body acts on the cover anchor clip, the vicinities of the pair of notches deform, enabling effective twisting between a portion of the base section to which the one anchor portion is connected and a portion of the base section to which the other anchor portion is connected.

A cover anchor clip of a fifth aspect of the disclosure is the cover anchor clip of the third aspect or the fourth aspect, wherein one notch is respectively formed to each of the edges on either side of the center line.

In the above configuration, one notch is respectively formed to each of the edges on either side of the center line. A pair of notches is thereby formed with the two notches.

Such a simple configuration enables the base section to twist effectively when force to pull the cover anchor clip out from the foam body has acted on the cover anchor clip.

A cover anchor clip of a sixth aspect of the disclosure is the cover anchor clip of any one of the third aspect to the fifth aspect, wherein an adjacent portion of the notch formed to one of the edges and an adjacent portion of the notch formed to the other of the edges are disposed at asymmetrical positions about the center line, the adjacent portions are located closest to the center line.

In the above configuration, the one adjacent portion and the other adjacent portion are disposed at differing, asymmetrical positions about the center line extending in the length direction. The base section can thereby effectively twist about an axis of the shortest straight line joining between the one adjacent portion and the other adjacent portion when force to pull the cover anchor clip out from the foam body acts on the cover anchor clip.

A cover anchor clip of a seventh aspect of the disclosure is the cover anchor clip of any one of the first aspect to the fourth aspect, wherein a step portion where a plate thickness of the base section changes is formed on a face of the base section on the opposite side to a face on which the anchor portion is disposed.

A cover anchor clip of an eighth aspect of the disclosure is the cover anchor clip of the seventh aspect, wherein a portion of the base section at a central portion in the length direction has greater plate thickness than that at another portion.

According to the disclosure, the cover anchor clip can be suppressed from being pulled out from the foam body.

BRIEF DESCRIPTION OF THE DRAWINGS

Preferred embodiments will be described in detail based on the following figures, wherein.

DETAILED DESCRIPTION

Figure 1:
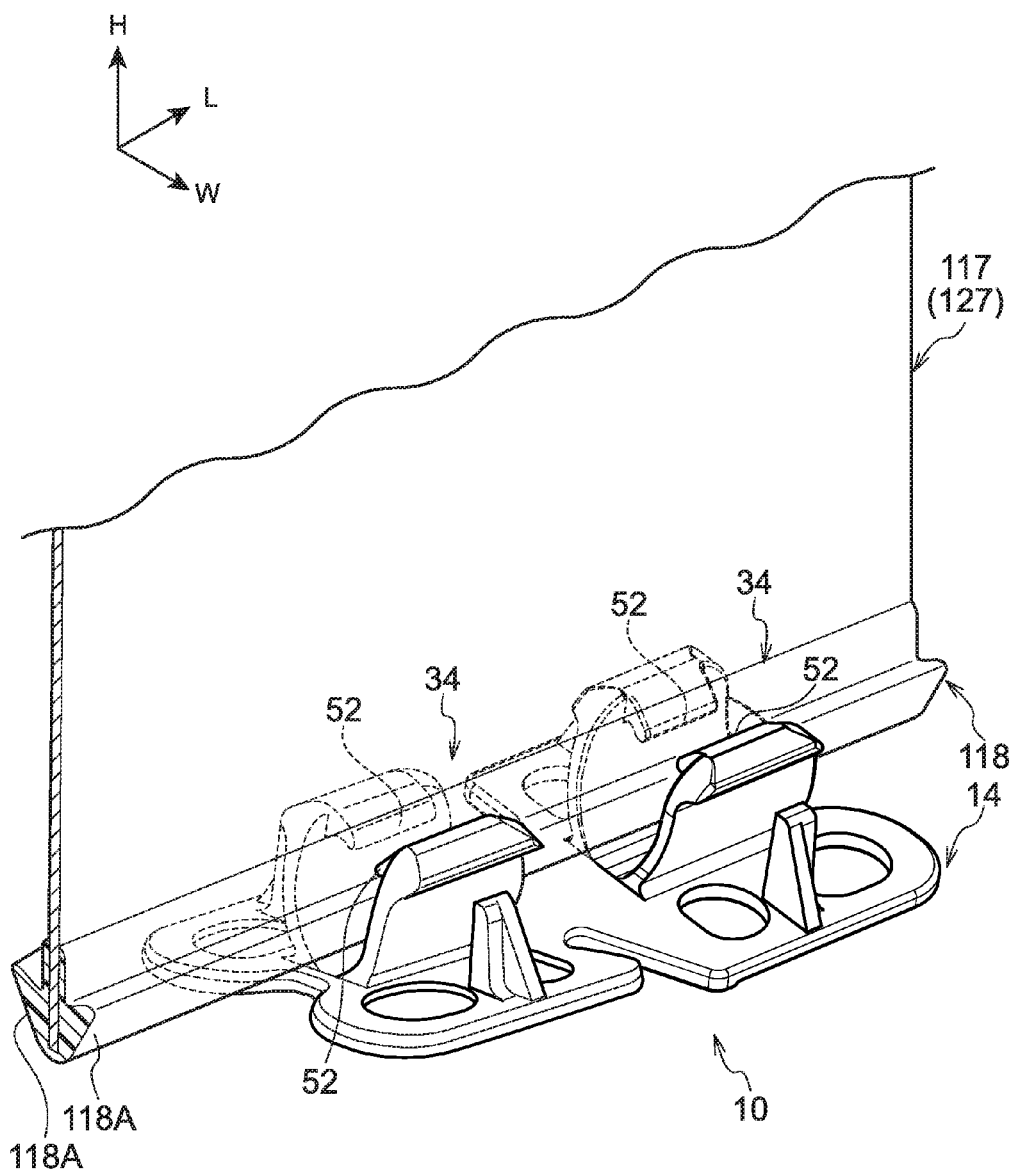
FIG. 1 is a perspective view illustrating a clip according to an exemplary embodiment of the present invention.

Explanation follows regarding an example of a cover anchor clip according to an exemplary embodiment of the present invention, with reference to FIG. 1 to FIG. 17. Note that in the drawings, the arrow H indicates an up-down direction of the cover anchor clip, the arrow W indicates a width direction of the cover anchor clip, and the arrow L indicates a front-rear direction of the cover anchor clip. In the exemplary embodiments, when "an up-down direction", "a width direction", and "a front-rear direction" are used, the respective directions mean the directions with respect to the cover anchor clip of the exemplary embodiment.

Overall Configuration

Figure 15:
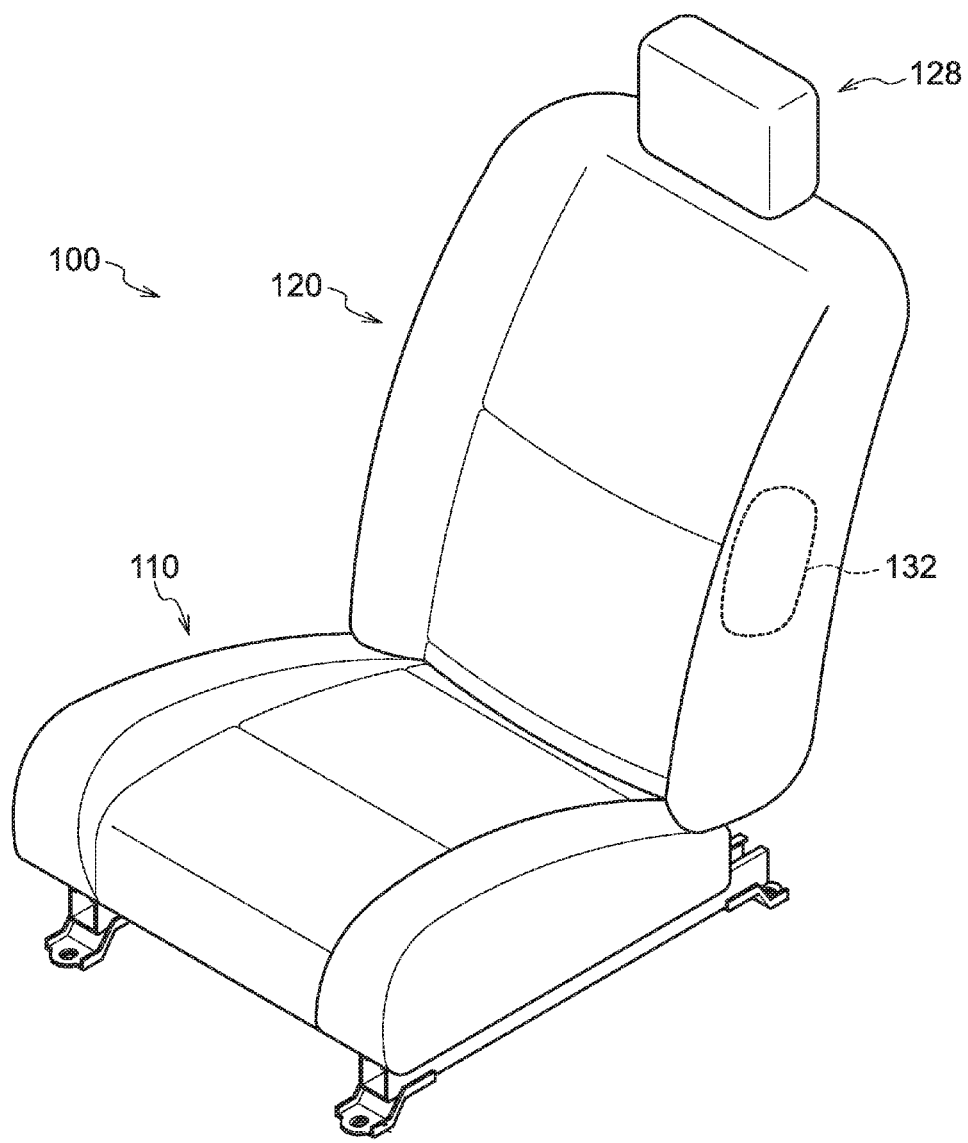
FIG. 15 is a perspective view illustrating a seat employing a clip according to an exemplary embodiment of the present invention.

First, explanation follows regarding a vehicle seat 100 in which a cover anchor clip 10 (referred to below simply as "clip 10") is employed. As illustrated in FIG. 15, the seat 100 includes a cushion section 110, a back section 120, and a headrest 128 that respectively support the buttocks or the like, the back and lumbar region or the like, and the head of an occupant.

Figure 14:
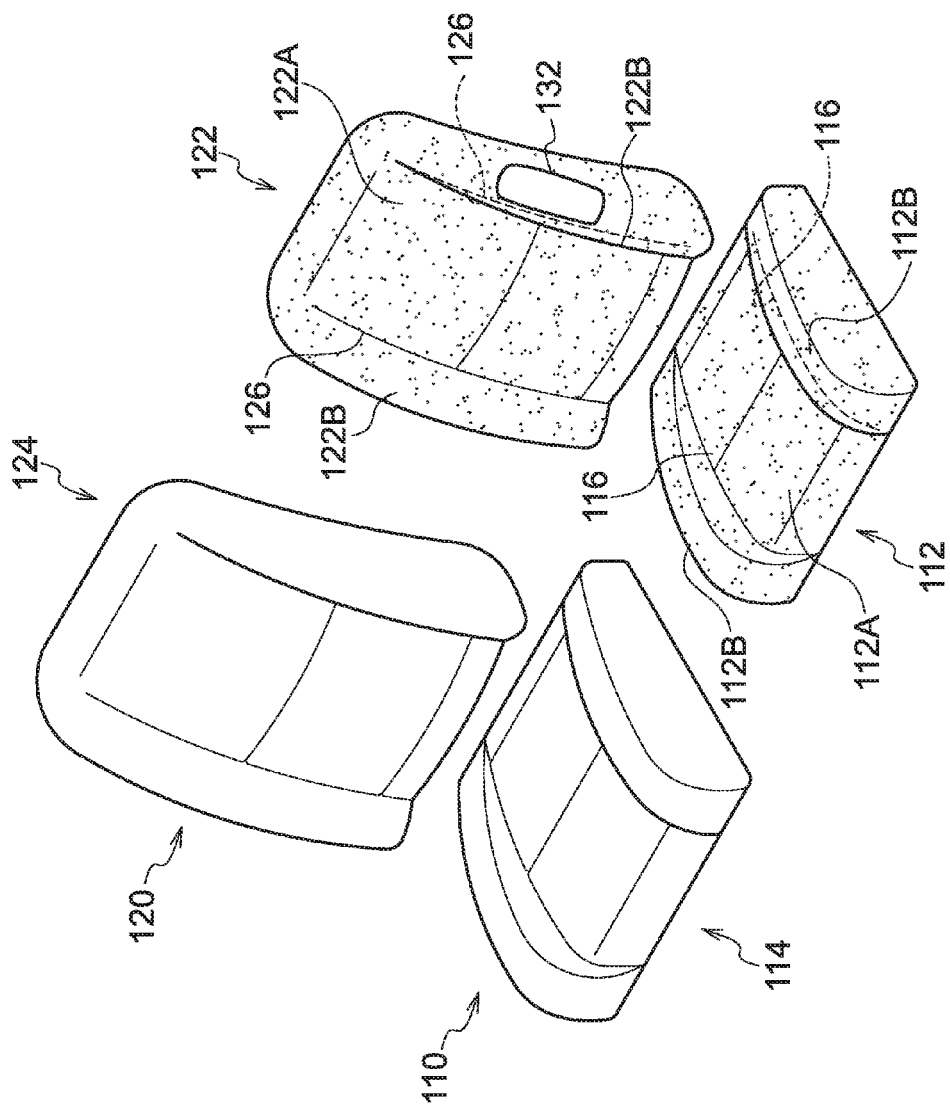
FIG. 14 is an exploded perspective view illustrating a seat employing a clip according to an exemplary embodiment of the present invention.

As illustrated in FIG. 14, the cushion section 110 includes a cushion 112 (an example of a foam body) and a cover 114. Moreover, the cushion 112 includes a main portion 112A and a pair of support portions 112B disposed on either side of the main portion 112A in the width direction thereof.

Grooves 116 are formed between the respective support portions 112B and the main portion 112A, and the clips 10 are disposed at a bottom of the grooves 116. Specifically, when foam molding the cushion 112, the clips 10 are inserted in the mold so as to dispose the clips 10 at the bottom of the grooves 116 (see FIG. 4).

Figure 7:
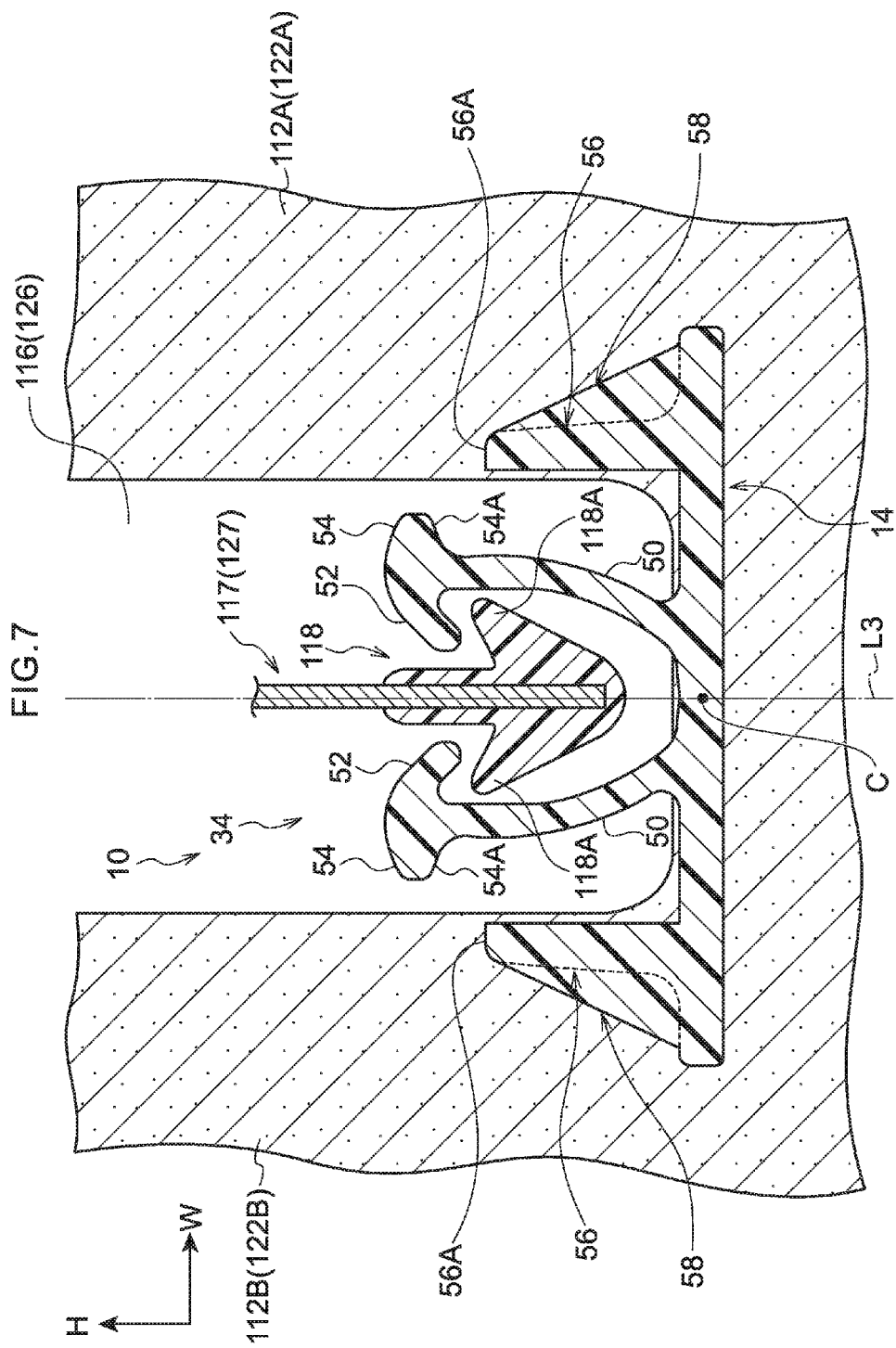
FIG. 7 is a cross-section illustrating a clip according to an exemplary embodiment of the present invention.
Figure 8:
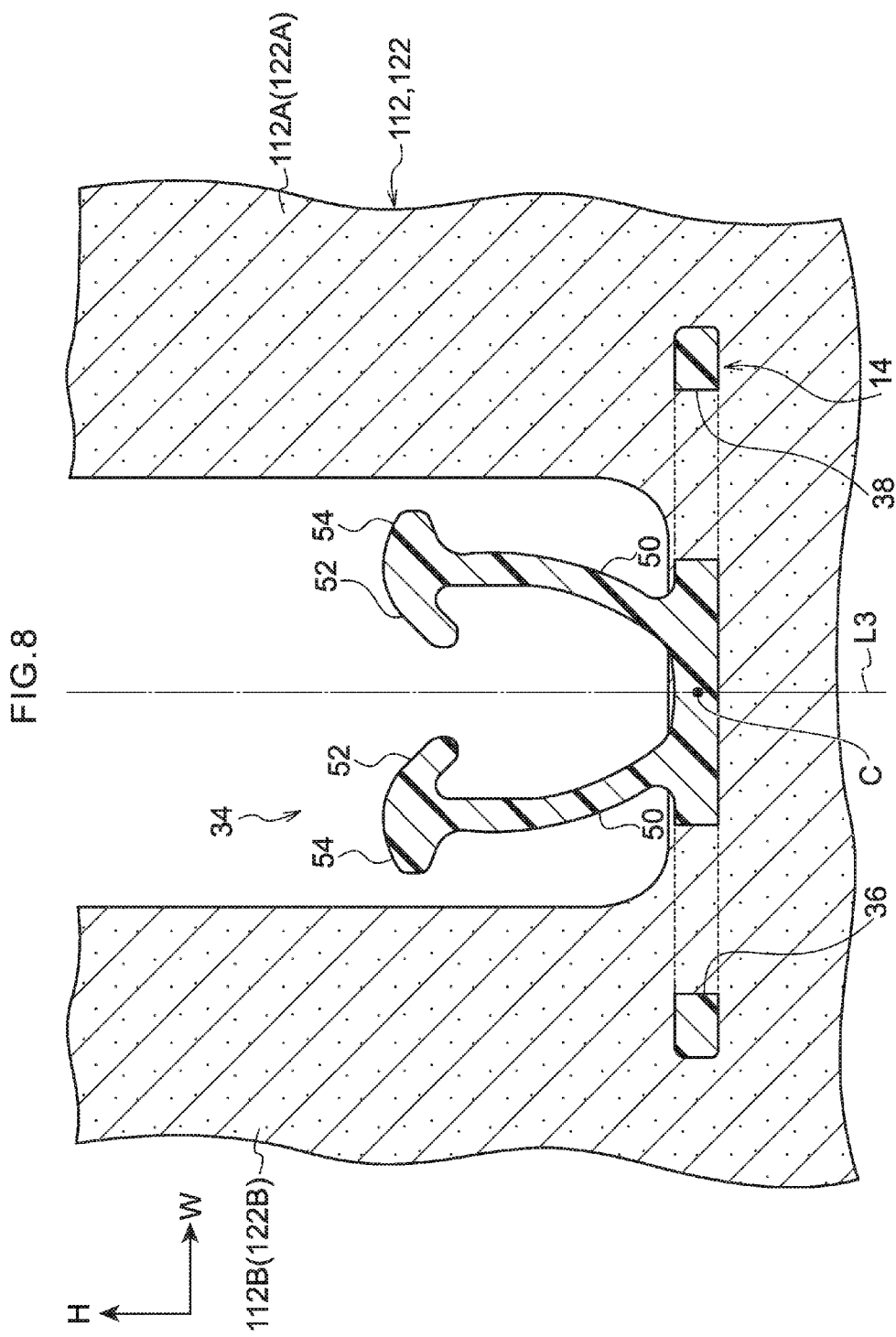
FIG. 8 is a cross-section illustrating a clip according to an exemplary embodiment of the present invention.

Suspenders 118, serving as examples of an anchored portion and fixed to a sheet member 117 attached to the cover 114, are attached to the clips 10 (see FIG. 7). Note that the suspenders 118 and the clips 10 are described in detail later.

Similarly, as illustrated in FIG. 14, the back section 120 includes a cushion 122 (an example of a foam body) and a cover 124. The cushion 122 includes a main portion 122A and a pair of support portions 122B disposed on either side of the main portion 122A in the width direction thereof.

Grooves 126 are formed between the respective support portions 122B and the main portion 122A, and the clips 10 are disposed at a bottom of the grooves 126. Specifically, when foam molding the cushion 122, the clips 10 are inserted in the mold so as to dispose the clips 10 at the bottom of the grooves 126 (see FIG. 4).

A side airbag 132 (referred to below simply as "airbag") is disposed on one support portion 122B side. A slit (not illustrated in the drawings) for releasing the airbag 132 to the outside when the airbag 132 is deployed, is formed at the cover 124.

Suspenders 118, serving as examples of an anchored portion, that are fixed to a sheet member 127 attached to the cover 124, are attached to the clip 10 (see FIG. 7). Note that the suspenders 118 and the clips 10 are described in detail later.

Suspender

Each of the suspenders 118 extends along a bottom face of the groove 116, 126 and is tapered at a leading end side, as illustrated in FIG. 7. A pair of protrusions 118A are formed projecting toward the outside (left-right direction sides in FIG. 7) at a portion on a base end side of each suspender 118.

Clip

Figure 10:
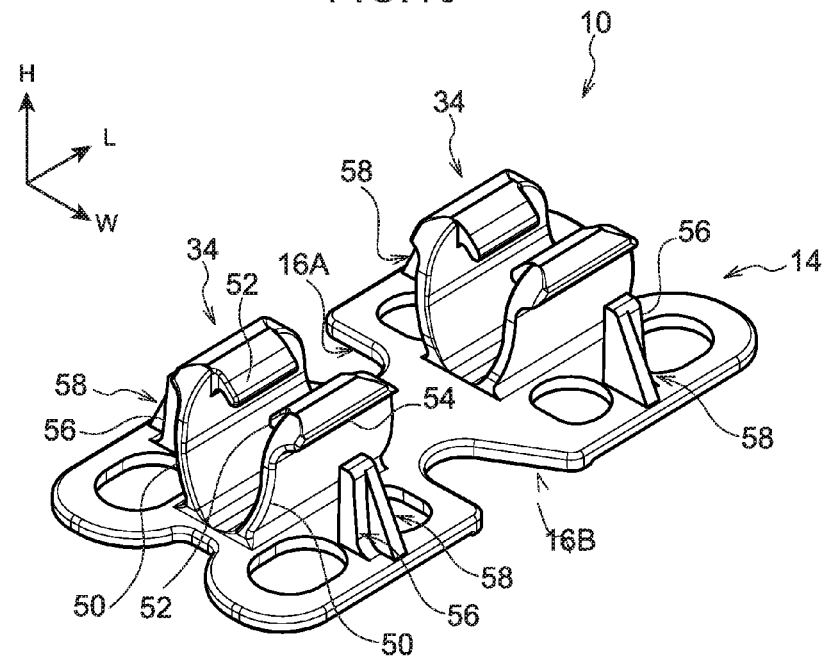
FIG. 10 is a perspective view of a clip according to an exemplary embodiment of the present invention, as viewed from the upper side.

Each clip 10 is integrally formed from a resin material, and, as illustrated in FIG. 10, includes a plate shaped base section 14 that is retained by the cushions 112, 122 (see FIG. 14), and two anchor portions 34 standing out from a front face of the base section 14 toward the upper side.

Base Section

Figure 12:
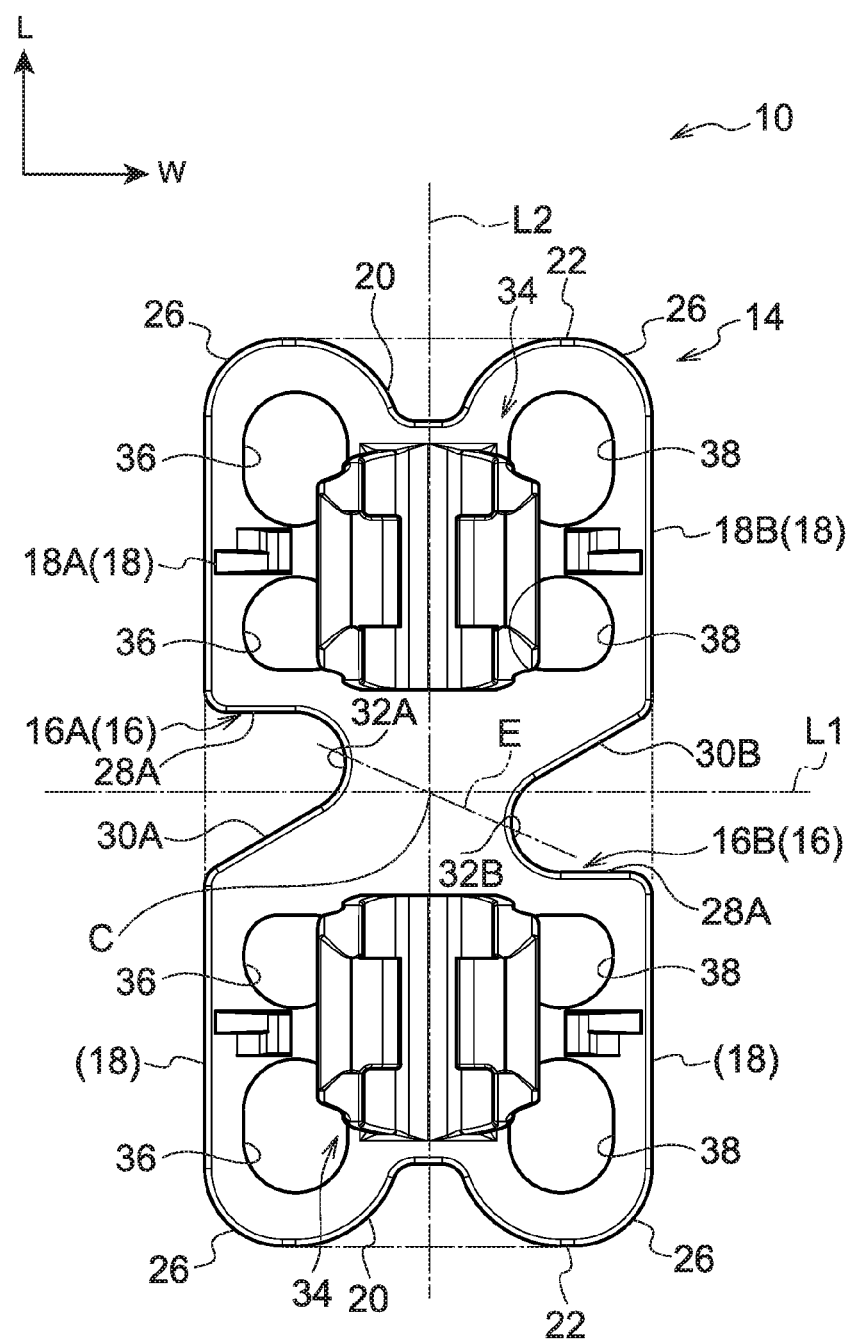
FIG. 12 is a plan view illustrating a clip according to an exemplary embodiment of the present invention.

A plate face of the base section 14 faces in the up-down direction and extends in the front-rear direction (a length direction), and the base section 14 is formed by a rectangular plate body extending in the front-rear direction. Furthermore, as illustrated in FIG. 12, the base section 14 includes a pair of edges 18 that extend in the front-rear direction and that are each formed with a notch 16, and a pair of edges 22 that couple the pair of edges 18 together at both end portions thereof and that are each formed with a notch 20.

Specifically, the respective edges 18 and the respective edges 22 are coupled together through circular arc shaped edges 26. Moreover, the notch 20 formed to one of the edges 22, and the notch 20, formed to the other of the edges 22, are each has recessed shapes as viewed from the upper side and are formed symmetrically to each other about a center line L1 of the base section 14 extending in the width direction. Note that the center line L1 passes through the center C (centroid) of the base section 14, and is a straight line extending in the width direction.

A notch 16A formed to one of the edges 18A and a notch 16B formed to the other of the edges 18B are each has recessed shapes as viewed from the upper side. Furthermore, the pair of notches 16A, 16B are each disposed in the front-rear direction between one of the anchor portions 34 and another of the anchor portions 34. The notch 16A and the notch 16B are asymmetrical to each other about a center line L2 of the base section 14 extending in the front-rear direction. Note that the center line L2 passes through the center C (centroid) of the base section 14, and is a straight line extending in the front-rear direction.

The notches 16A, 16B include straight line portions 28A, 28B extending in the width direction, angled portions 30A, 30B angled with respect to the width direction, and circular arc portions 32A, 32B that couple leading end sides of the straight line portions 28A, 28B together with leading end sides of the angled portions 30A, 30B. In the present exemplary embodiment, as viewed from the upper side, the notch 16A and the notch 16B are formed with point symmetry about the center C of the base section 14, and the circular arc portion 32A of the notch 16A is disposed on one side of the center line L1, and the circular arc portion 32B of the notch 16B is disposed on the other side of the center line L1. In other words, the circular arc portion 32A (an example of an adjacent portion) that is closest to the center line L2 in the notch 16A, and the circular arc portion 32B (an example of an adjacent portion) that is closest to the center line L2 in the notch 16B, are disposed at different positions asymmetrical to each other about the center line L2.

The base section 14 is formed with four through holes 36 in a line along the one edge 18A, and four through holes 38 in a line along the other edge 18B. Namely, the through holes 36, 38 are formed in respective lines along the front-rear direction, in plural rows across the width direction (two rows in the present exemplary embodiment). The foam bodies enter the through holes 36, 38 (see FIG. 8) during foam molding of the cushions 112, 122 (see FIG. 14).

Figure 11:
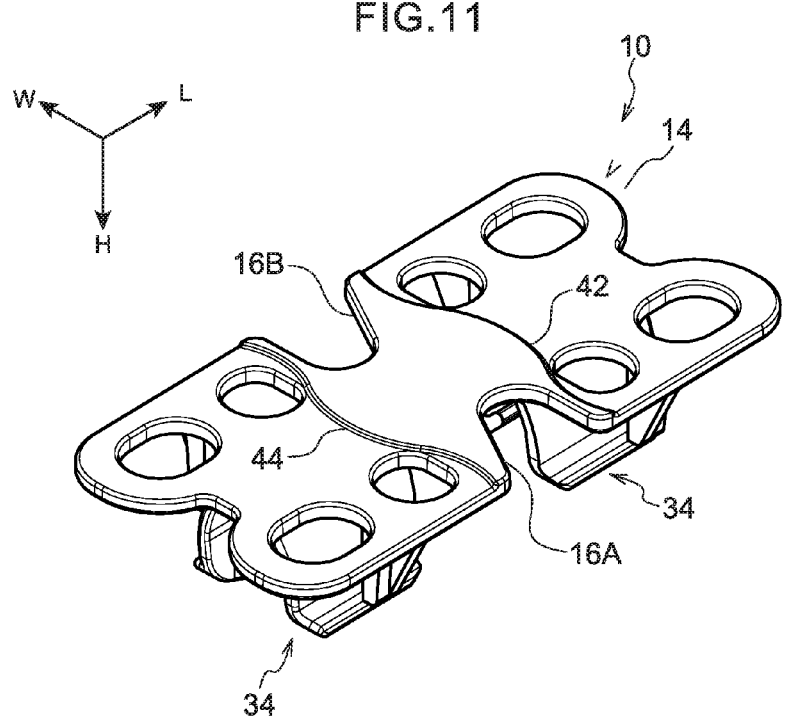
FIG. 11 is a perspective view of a clip according to an exemplary embodiment of the present invention, as viewed from the lower side.

As illustrated in FIG. 11, step portions 42, 44 (examples of portions where a plate thickness changes) where the plate thickness of the base section 14 changes are formed to a back face of the base section 14, that is an opposite side face to the face on which the anchor portions 34 are disposed. In the present exemplary embodiment, a front-rear direction central portion of the base section 14 has a plate thickness of 1.2 mm, and other general portions of the base section 14 have a plate thickness of 1.0 mm.

Figure 13:
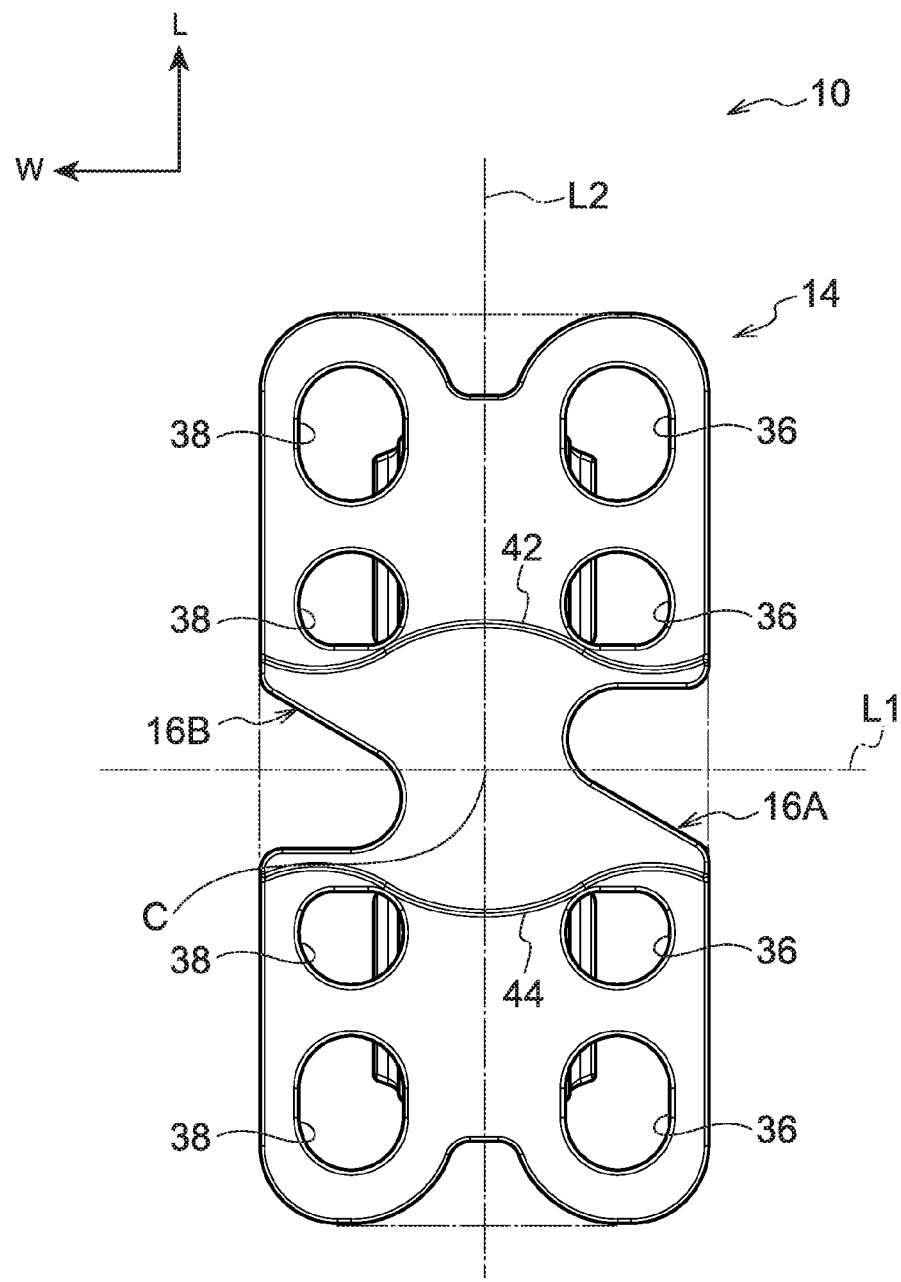
FIG. 13 is bottom view illustrating a clip according to an exemplary embodiment of the present invention.

Specifically, as viewed from the lower side, as illustrated in FIG. 13, the step portion 42 is disposed on one side of the center line L1, and the step portion 44 is disposed on the other side of the center line L1. A portion of the base section 14 between the step portion 42 and the step portion 44 has a plate thickness of 1.2 mm.

Figure 4:
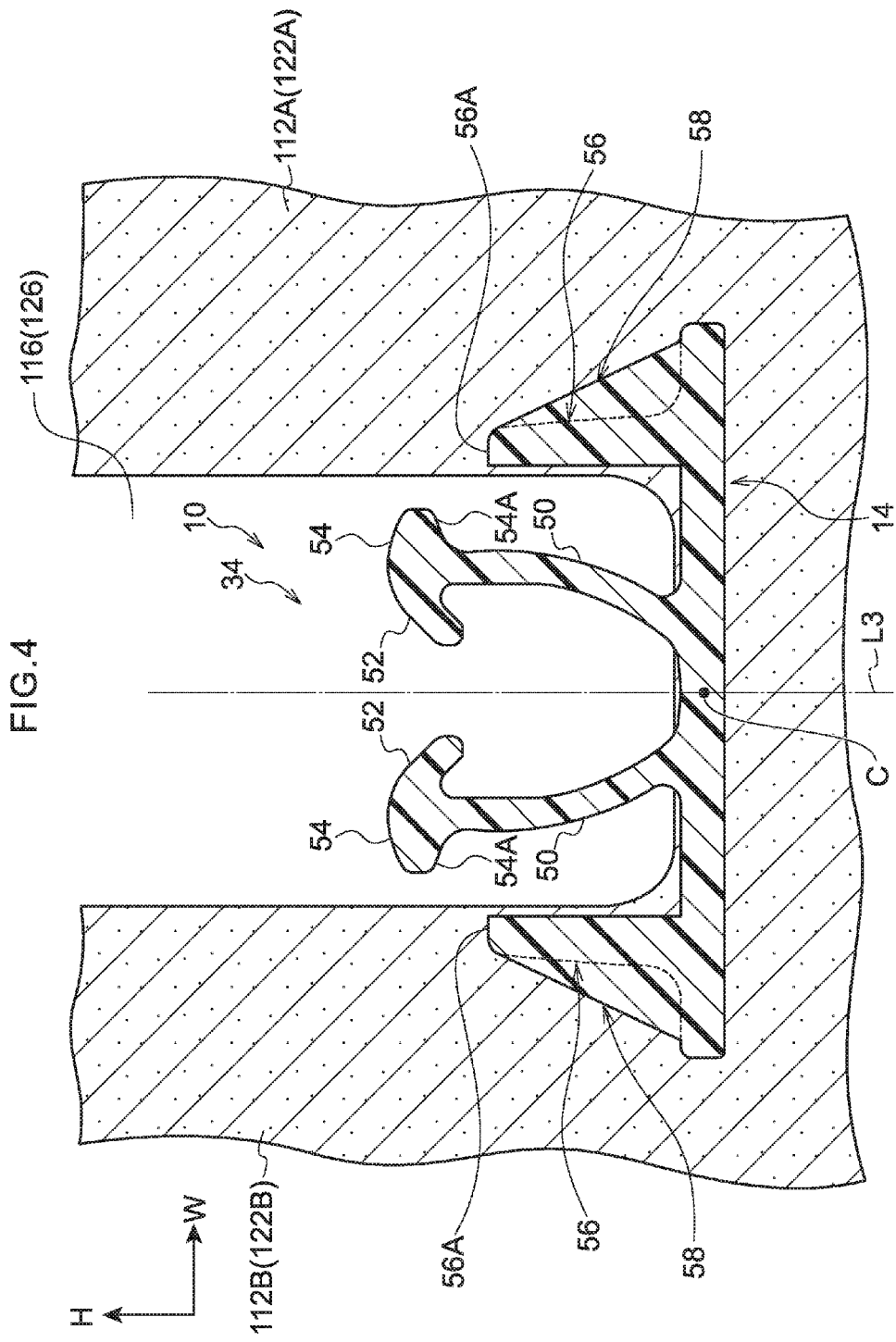
FIG. 4 is a cross-section illustrating a clip according to an exemplary embodiment of the present invention.

In this configuration, in a state in which the respective clips 10 are disposed in the cushions 112, 122, as illustrated in FIG. 4, the base sections 14 are disposed so as to extend running along the bottom faces of the grooves 116, 126 of the cushions 112, 122.

Anchor Portion

As illustrated in FIG. 10, two of the anchor portions 34 are disposed side-by-side in the front-rear direction, standing out from the front face of the base section 14 toward the upper side. As illustrated in FIG. 12, one anchor portion 34 and the other anchor portion 34 are disposed on either side of the center line L1. The notches 16A, 16B are disposed between the one anchor portion 34 and the other anchor portion 34, as described above. Since each of the anchor portions 34 is configured with a similar shape, explanation follows regarding the one anchor portion 34.

As illustrated in FIG. 4 and FIG. 10, each anchor portion 34 includes a pair of extension portions 50 standing out from the front face of the base section 14 and disposed facing each other, and a pair of anchor claws 52 that are respectively formed to leading ends of the extension portions 50 and that fit around and anchor the suspenders 118 mentioned above.

The pair of extension portions 50 and the pair of anchor claws 52 are symmetrical to each other about a center line L3 (see FIG. 4) of the base section 14 extending in the up-down direction. Note that the center line L3 passes through the center C (centroid) of the base section 14 and is a straight line extending in the up-down direction.

The pair of extension portions 50 are angled toward the width direction outside so as to be further apart from each other at leading end sides than at base end sides. The respective extension portions 50 are curved so as to protrude toward the width direction outside. The respective extension portions 50 are capable of undergoing elastic deformation such that the leading ends of the respective extension portions 50 move away from each other.

Furthermore, the anchor claws 52 are formed to the leading ends of the respective extension portions 50 such that leading edges of the pair of anchor claws 52 approach each other.

In this configuration, in a state in which the clips 10 are disposed in the cushions 112, 122, as illustrated in FIG. 4, the anchor portions 34 are disposed in the grooves 116, 126 of the cushions 112, 122, and are exposed from the foam body to the exterior.

Figure 6:
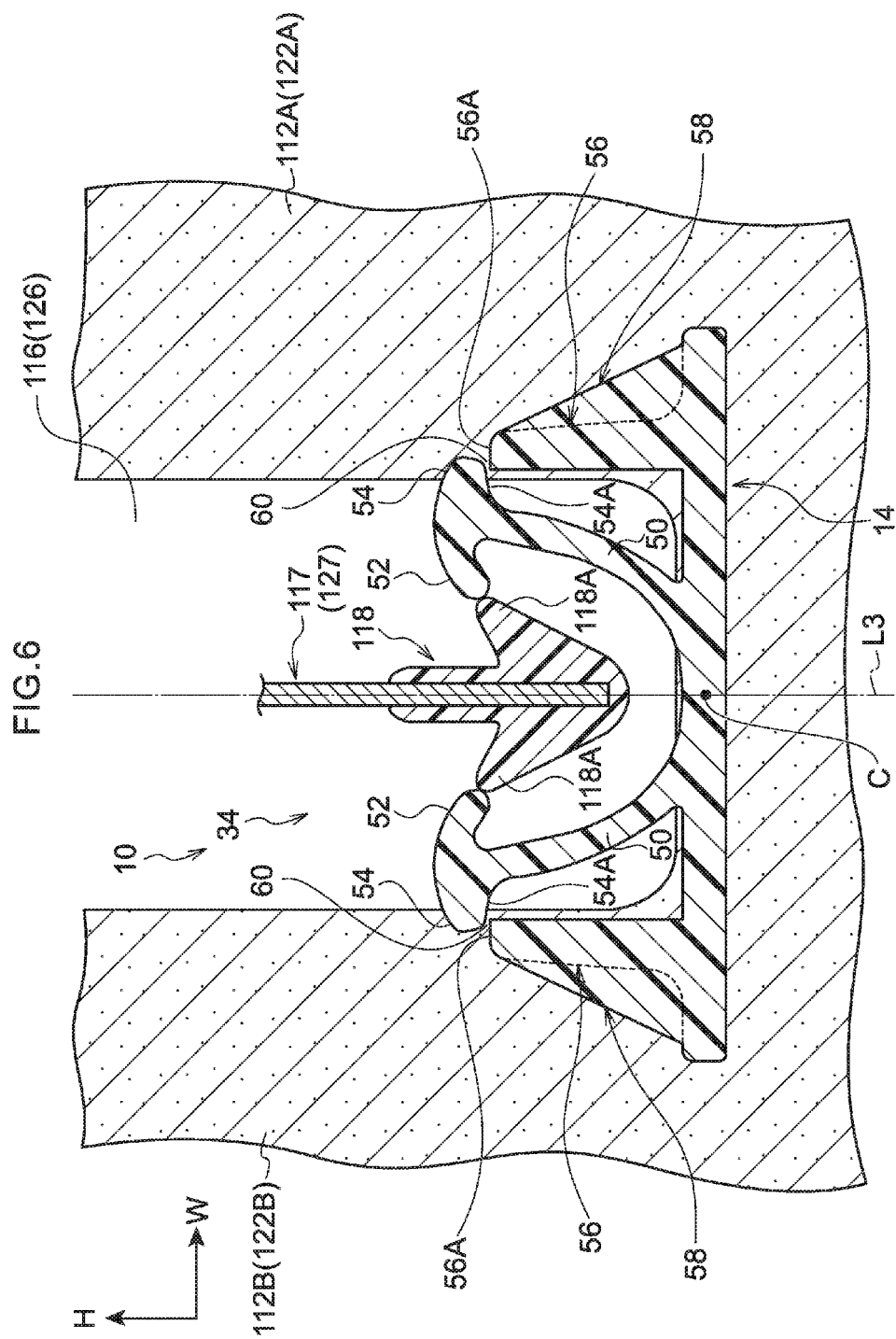
FIG. 6 is a cross-section illustrating a clip according to an exemplary embodiment of the present invention.

In order to fit the pair of anchor claws 52 around and anchor the suspender 118, as illustrated in FIG. 6 and FIG. 7, the respective extension portions 50 elastically deform such that the pair of anchor claws 52 move away from each other.

Other

Protrusions 54 are respectively formed to the leading ends of the pair of extension portions 50.

As illustrated in FIG. 4, the protrusions 54 protrude out toward the opposite side to the side at which the extension portions 50 face each other (opposite side to the side formed with the anchor claws 52), and each protrusion 54 is formed with a lower face 54A (an example of a contact face) facing the lower side.

The clip 10 includes pairs of upstanding portions 56 that stand out from the base section 14 toward the upper side in the up-down direction (an example of an upstanding direction), and that are respectively disposed on the width direction outside of each extension portion 50. Leading end portions of each pair of upstanding portions 56 are formed with top faces 56A facing the upper side in the up-down direction.

Furthermore, a triangular rib 58 supporting the upstanding portion 56 is formed on the width direction outside of each upstanding portion 56.

In this configuration, in a state in which the clips 10 are disposed in the cushions 112, 122, as illustrated in FIG. 4, the upstanding portions 56 are disposed inside the cushions 112, 122.

Figure 9:
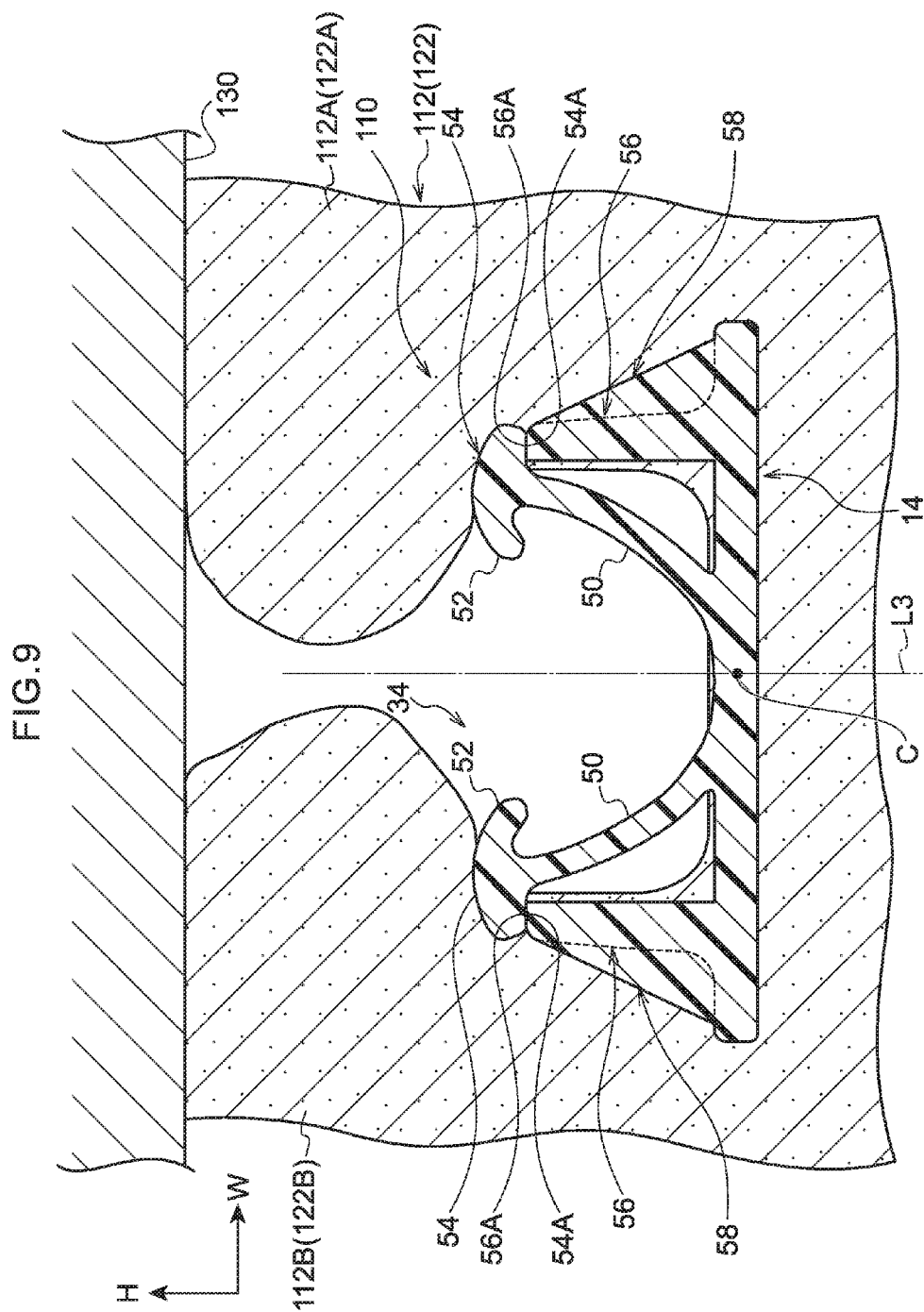
FIG. 9 is a cross-section illustrating a clip according to an exemplary embodiment of the present invention.

When the extension portions 50 elastically deform such that the pair of anchor claws 52 move away from each other, as illustrated in FIG. 9, the lower faces 54A of the protrusions 54 can contact the top faces 56A of the upstanding portions 56 so as to make face-to-face contact.

Operation and Advantageous Effects

Next, explanation follows regarding operation of the clips 10, with reference to an operation to attach the suspenders 118, which are fixed to the sheet members 117, 127 attached to the covers 114, 124, to the clips 10, and to deformation behavior of the clips 10 when the airbag 132 is deployed.

Attachment Operation

Figure 5:
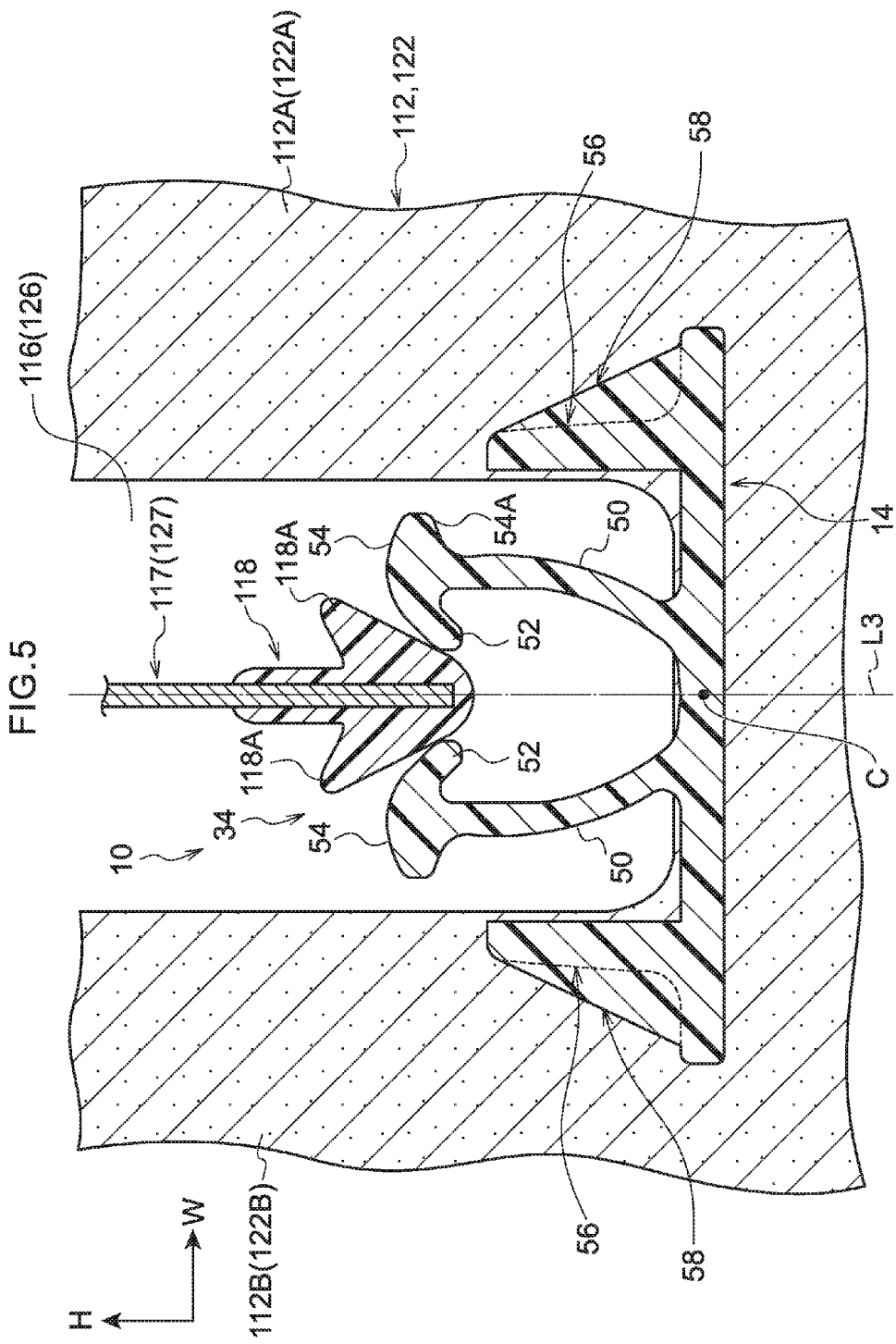
FIG. 5 is a cross-section illustrating a clip according to an exemplary embodiment of the present invention.

When attaching the suspender 118 to the clips 10, as illustrated in FIG. 5, the suspender 118 is inserted into the grooves 116, 126. When the suspender 118 is inserted into the grooves 116, 126, the tapered leading end portion of the suspender 118 contacts the pairs of anchor claws 52 of the respective clips 10.

When the suspender 118 is inserted further toward the bottom of the grooves 116, 126, as illustrated in FIG. 6, the pair of anchor claws 52 are pressed by the suspender 118 and the extension portions 50 elastically deform such that the pair of anchor claws 52 move away from each other. The suspender 118 is thereby allowed to pass between the pair of anchor claws 52. When this occurs, the lower faces 54A of the protrusions 54 and the top faces 56A of the upstanding portions 56 are not in contact, and a gap 60 is formed between each lower face 54A and top face 56A.

When the protrusions 118A of the suspender 118 pass between the pair of anchor claws 52, as illustrated in FIG. 7, the extension portions 50 undergo elastic recovery, such that the pair of anchor claws 52 fit around and anchor the suspender 118. The suspender 118 is thereby attached to the clip 10.

The attachment operation to attach the suspender 118 to the clip 10 is thereby completed.

During Airbag Deployment

Figure 2:
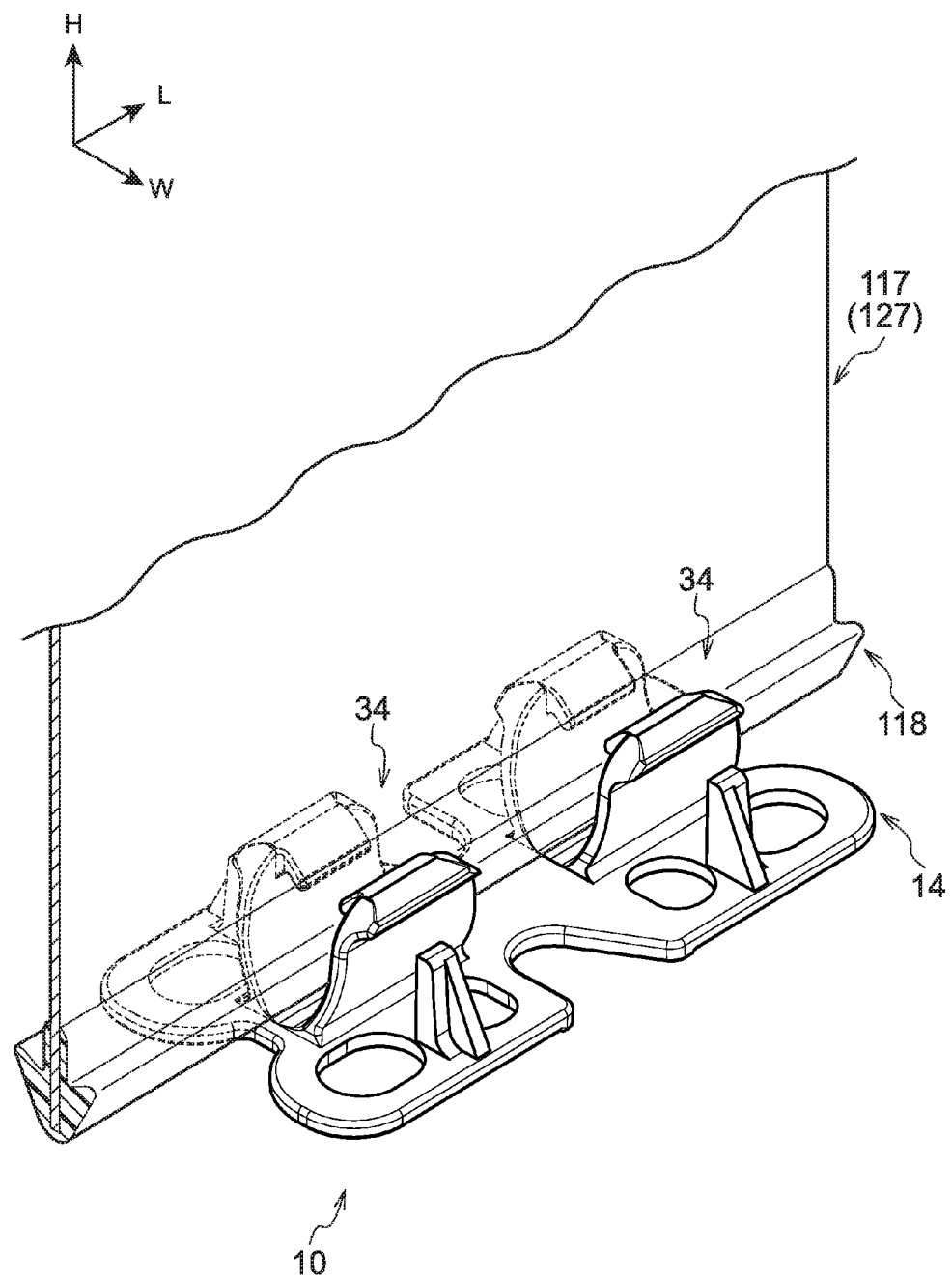
FIG. 2 is a perspective view illustrating a clip according to an exemplary embodiment of the present invention.

As illustrated in FIG. 2 and FIG. 7, in a state in which the suspender 118 is attached to the clip 10, the plate shaped base section 14 is not deformed.

Figure 3:
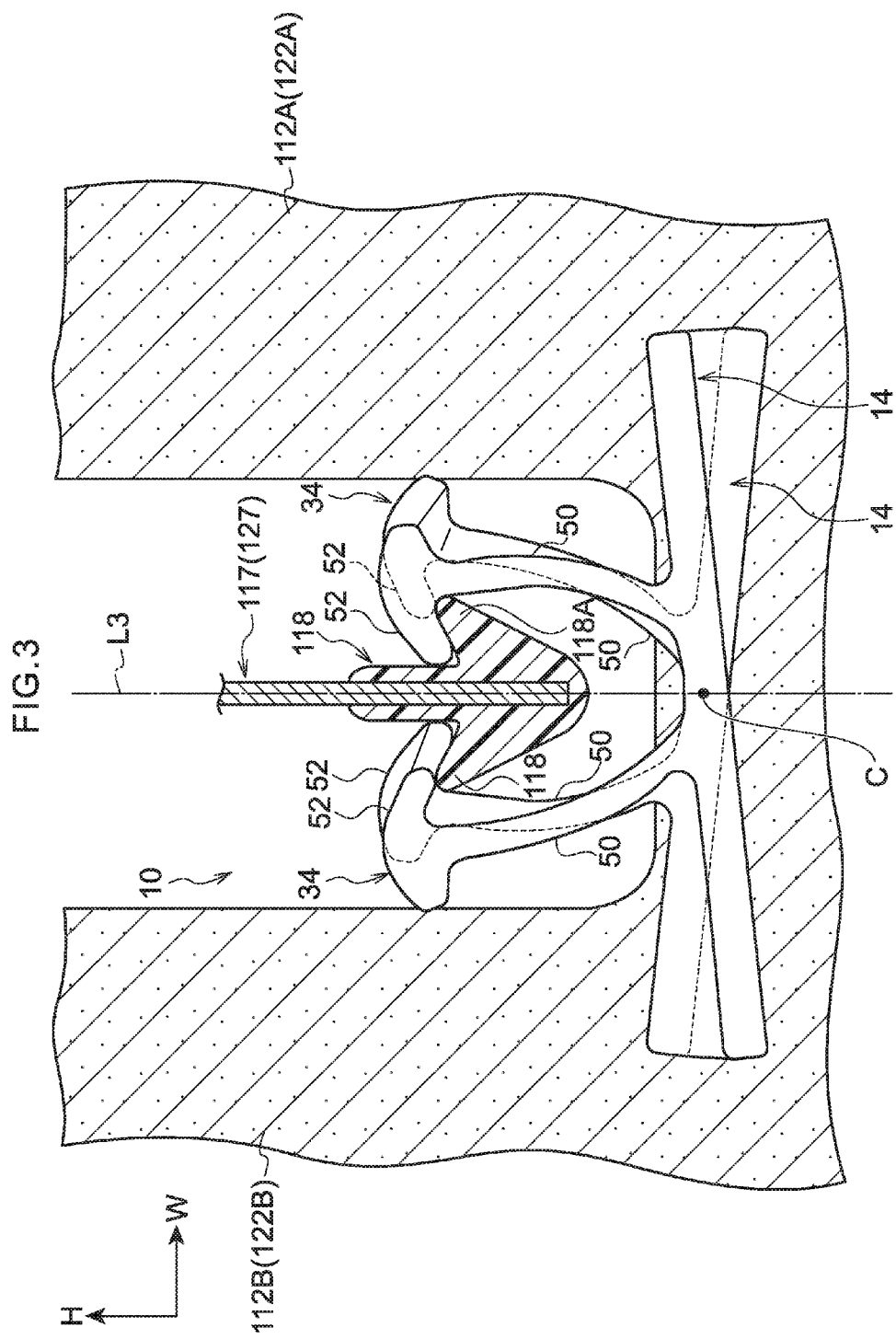
FIG. 3 is a cross-section illustrating a clip according to an exemplary embodiment of the present invention.

However, in cases in which the airbag 132 (see FIG. 14) has deployed for whatever reason, the airbag 132 presses the cover 124 from the inside of the seat 100. In the event that the airbag 132 presses the cover 124, as illustrated in FIG. 1 and FIG. 3, the suspender 118 moves toward the upper side. Due to the suspender 118 moving toward the upper side, the protrusions 118A of the suspender 118 press the anchor claws 52 of the anchor portions 34, and the anchor portions 34 are lifted toward the upper side. A force to pull the clips 10 out from the cushions 112, 122 thereby acts on the clips 10.

As illustrated in FIG. 1, two of the anchor portions 34 are formed side-by-side in the front-rear direction in each clip 10. As illustrated in FIG. 12, the notch 16A and the notch 16B, formed between the one anchor portion 34 and the other anchor portion 34 in the front-rear direction, are asymmetrical to each other about the center line L2. The circular arc portion 32A of the notch 16A is disposed on the one side of the center line L1, and the circular arc portion 32B of the notch 16B is disposed on the other side of the center line L1.

Accordingly, when the one anchor portion 34 (on the right in FIG. 1) and the other anchor portion 34 (on the left in FIG. 1) are lifted toward the upper side, as illustrated in FIG. 1, there is twisting between the portion of the base section 14 to which the one anchor portion 34 is connected and the portion of the base section 14 to which the other anchor portion 34 is connected.

Specifically, as illustrated in FIG. 12, the portion of the base section 14 to which the one anchor portion 34 is connected and the portion of the base section 14 to which the other anchor portion 34 is connected twist about an axis of a shortest straight line E joining between the circular arc portion 32A and the circular arc portion 32B. As illustrated in FIG. 3, the portion of the base section 14 to which the one anchor portion 34 is connected rotates in the clockwise direction in the drawing, and the portion of the base section 14 to which the other anchor portion 34 is connected rotates in the counterclockwise direction in the drawing.

Each of the anchor portions 34 is thereby lifted toward the upper side, and force transmitted from the anchor portions 34 to the base section 14 is dispersed into a force pressing the cushions 112, 122 obliquely toward the right upper side in FIG. 3, and a force pressing the cushions 112, 122 obliquely toward the left upper side in FIG. 3.

As explained above, the force transmitted from the anchor portions 34 to the base section 14 is dispersed into a force pressing the cushions 112, 122 obliquely toward the right upper side in FIG. 3, and a force pressing the cushions 112, 122 obliquely toward the left upper side in FIG. 3. The force from the base section 14 acting on the cushions 112, 122 can thereby be suppressed from pulling out the clips 10 from the cushions 112, 122 compared to cases in which force from the base section 14 acts in a uniform direction.

The notches 16A, 16B are disposed between the one anchor portion 34 and the other anchor portion 34 in the front-rear direction. This thereby enables effective twisting between the portion of the base section 14 to which the one anchor portion 34 is connected and the portion of the base section 14 to which the other anchor portion 34 is connected.

The pair of notches 16A, 16B are respectively formed on either side of the center line L2, with one each on the one edge 18A and the other edge 18b. Simple configuration in this manner enables effective twisting between the portion of the base section 14 to which the one anchor portion 34 is connected and the portion of the base section 14 to which the other anchor portion 34 is connected.

Disposing the one circular arc portion 32A and the other circular arc portion 32B at different positions in the front-rear direction enables the base section 14 to twist effectively about the axis of the shortest straight line joining between the one circular arc portion 32A and the other circular arc portion 32B when force to pull the clips 10 out from the cushions 112, 122 acts on the clips 10.

Figure 16:
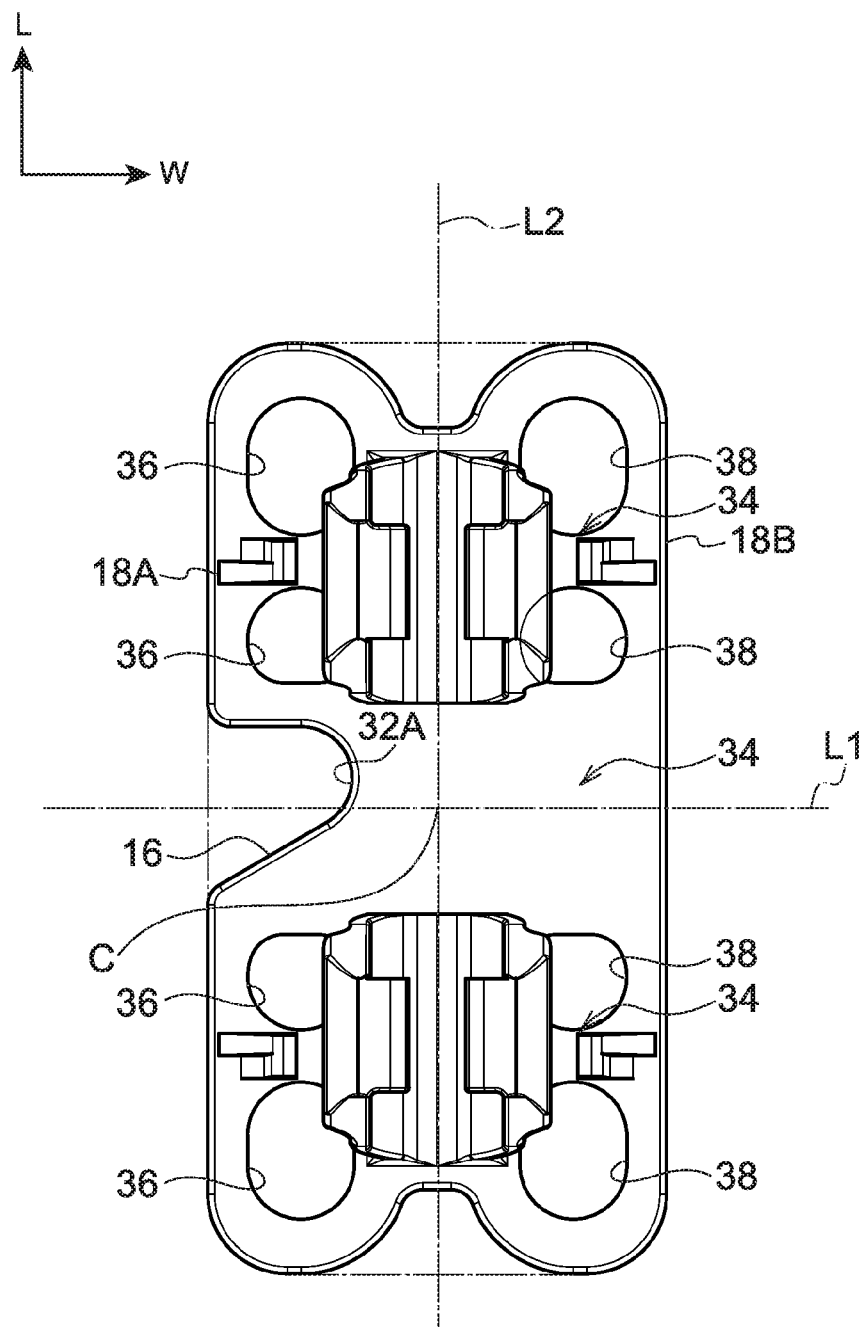
FIG. 16 is a plan view illustrating a modified example of a clip according to an exemplary embodiment of the present invention.

Note that detailed explanation has been given regarding a particular exemplary embodiment of the present invention; however, the present invention is not limited to this exemplary embodiment, and it would be obvious to a practitioner skilled in the art that various other exemplary embodiments may be implemented within the scope of the present invention. For example, in the exemplary embodiment explained above, the notches 16A, 16B are respectively formed with one each on the one edge 18A and the other edge 18B on either side of the center line L2; however, as illustrated in FIG. 16, the notch 16 may be formed to the one edge 18A alone. It is sufficient that the base section 14 is able to twist when the one anchor portion 34 and the other anchor portion 34 are lifted toward the upper side.

Figure 17:
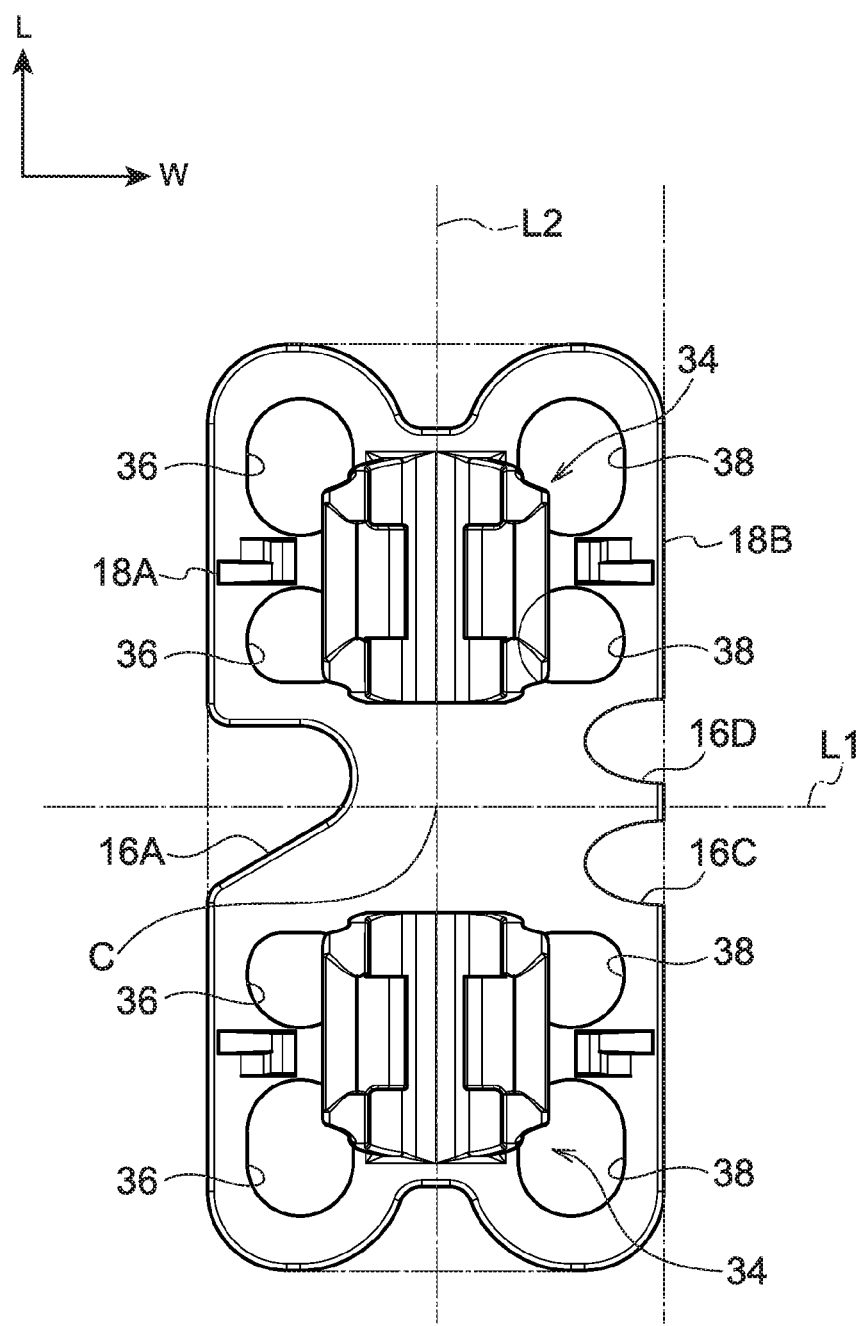
FIG. 17 is a plan view illustrating a modified example of a clip according to an exemplary embodiment of the present invention.

In the exemplary embodiment explained above, the notches 16A, 16B are respectively formed with one each on the one edge 18A and the other edge 18B on either side of the center line L2; however, as illustrated in FIG. 17, plural (two in FIG. 17) notches 16C, 16D may be formed to the other edge 18B, for example. It is sufficient that the base section 14 is able to twist when the one anchor portion 34 and the other anchor portion 34 are lifted toward the upper side.

In the exemplary embodiment explained above, two of the anchor portions 34 are provided to the clip 10; however, three or more may be provided.

In the exemplary embodiment explained above, the four through holes 36 and the four through holes 38 are respectively formed running side-by-side in the front-rear direction in two rows across the width direction; however, the numbers of the respective through holes may be a number other than four, and there may be three or more through hole rows.

In the exemplary embodiment explained above, explanation has been given of an example of a case which the clips 10 attempt to pull out from the cushions 112, 122 due to the cover 124 being pressed by the airbag 132 during deployment of the airbag 132; however, it is sufficient that the force described above acts on the clips 10, even if it is not particularly due to deployment of the airbag 132.

In the exemplary embodiment explained above, explanation has been given of an example of a case in which the clip 10 is employed in the vehicle seat 100; however, the clip 10 may be employed in other seats (chairs) such as an office chair, a home sofa, or a legless chair.

What is claimed is:

1. A cover anchor clip comprising:
   a base section that is a rectangular shaped plate body for retention in a foam body, and that is formed with a plurality of through holes into which the foam body enters, the plurality of through holes are lined up along a length direction of the base section in a plurality of rows; and
   a plurality of anchor portions that are formed standing out from the base section side-by-side in the length direction of the base section, and each of that is configured to anchor an anchored portion fixed to a cover for covering the foam body, wherein:
   a notch is formed to one edge out of a pair of edges of the base section, the pair of edges extends in the length direction of the base section; and
   the notch is respectively formed to the pair of edges of the base section, and the notches are formed at positions asymmetrical to each other about a center line extending in the length direction of the base section as viewed in a plate thickness direction of the base section.

2. The cover anchor clip of claim 1, wherein the notch is disposed in the length direction between one of the anchor portions and another of the anchor portions.

3. The cover anchor clip of claim 1, wherein the notches are disposed in the length direction between one of the anchor portions and another of the anchor portions.

4. The cover anchor clip of claim 1, wherein one notch is respectively formed to each of the edges on either side of the center line.

5. The cover anchor clip of claim 1, wherein an adjacent portion of the notch formed to one of the edges and an adjacent portion of the notch formed to the other of the edges are disposed at asymmetrical positions about the center line, the adjacent portions are located closest to the center line.

6. The cover anchor clip of claim 1, wherein a step portion where a plate thickness of the base section changes is formed on a face of the base section on the opposite side to a face on which the anchor portion is disposed.

7. The cover anchor clip of claim 6, wherein a portion of the base section at a central portion in the length direction has greater plate thickness than that at another portion.

* * * * *